United States Patent [19]

Albertson

[11] Patent Number: 4,996,773
[45] Date of Patent: Mar. 5, 1991

[54] ARM CONTROLLED POWER CUTTER

[76] Inventor: Graham B. Albertson, 4340 Rumble Street, Burnaby, British Columbia, Canada, V5J 2A1

[21] Appl. No.: 440,858

[22] Filed: Nov. 24, 1989

Related U.S. Application Data

[63] Continuation of Ser. No. 208,104, Jun. 17, 1988.

[51] Int. Cl.$^5$ .................. B26B 27/00; B23D 57/02; A01G 3/03
[52] U.S. Cl. .................................. 30/121; 30/298; 30/296.1; 30/381
[58] Field of Search .................. 30/121, 272 R, 276, 30/296 R, 298, 381, 383, 222, 267; 224/222, 267

[56] References Cited

U.S. PATENT DOCUMENTS

| | | | |
|---|---|---|---|
| 712,843 | 11/1902 | Paul | 224/267 X |
| 2,504,880 | 4/1950 | Rittenhouse | 224/267 X |
| 2,637,357 | 5/1953 | Johnson et al. | 144/208 |
| 2,792,670 | 5/1957 | Haynes | 30/121 X |
| 2,932,127 | 4/1960 | Prance et al. | 30/121 X |
| 4,179,805 | 12/1979 | Yamada | 30/296.1 X |
| 4,304,275 | 12/1981 | Glover | 30/371 X |
| 4,593,466 | 6/1986 | O'Brien | 30/144 X |

FOREIGN PATENT DOCUMENTS

199400 11/1965 Sweden .

Primary Examiner—Paul A. Bell
Assistant Examiner—Kenneth E. Peterson
Attorney, Agent, or Firm—Bull, Housser & Tupper

[57] ABSTRACT

A portable power cutting apparatus has a control unit with a support for mounting the control unit on one arm of the user permitting the control unit and cutting tool to be supported by that arm. The support is pivotal and a flexible cable operatively connects a motor to the cutting tool for driving the tool. This permits the control unit to be pivoted in a lateral direction or twisted to allow the operator to move the cutting head in a variety of positions without loss of power by moving only the supporting arm and hand of the user. A handle is provided on the control unit for gripping by the hand of the user's support arm. A cutting tool suitable for girdling a tree and which can also be used to cut through tree branches and small tree trunks is also disclosed. This cutting tool is frustoconical in shape having a length of chainsaw chain wrapped in a spinal groove around the outside face of this tool body. In another embodiment the cutting tool is a chainsaw which can be operated with the supporting arm of the user.

41 Claims, 10 Drawing Sheets

ARM CONTROLLED POWER CUTTER

This is a continuation of application Ser. No. 208,104 filed June 17, 1988.

BACKGROUND OF THE INVENTION

1. Field of the Invention

The present invention relates to portable cutting devises, including those used for cutting trees or tree branches and those used for girdling a tree by cutting a strip of bark around the circumference of a tree. In addition, this invention is concerned with an apparatus for controlling a portable power cutting tool attached to the arm of the user and a method for using this apparatus.

2. Description of the Prior Art

It is common in the caretaking of forests to clear underbrush and extraneous trees from a forest to permit the optimum growth of the remaining trees. As well, in order for workers to move through a forested area underbrush, small trees and tree branches are often cleared to create or maintain a path through a forested area. It is also sometimes necessary to clear a forest of relatively mature trees. In the past forest workers have performed these operations with the use of small portable cutting devices which are usually designed to be hand held by the operator. Underbush clearing operations are commonly performed with the use of small handheld chainsaws. Clearing of mature trees is sometimes performed by a process known as "tree girdling". This process involves cutting a horizontal strip through the tree bark to the Cambian layer around the entire circumference of the tree. This process usually results in the death of the tree. An example of a hand held device used to girdle a tree may be found in U.S. Pat. No. 2,792,670 issued on May 21, 1957 to Haynes.

Hand held power cutting tools have proved to be unsatisfactory in cutting or girdling trees. Generally, both hands are required to control the power tool to ensure that the cut is properly placed on the tree and to ensure that the tool remains in the proper control of the operator. However, in moving through dense underbrush, it is desireable to leave one hand free to hold or push aside branches and small trees. It is also desireable to hold a part of the tree being cut or girdled, both to support the operator and to assist in the cutting process. Many hand held power tools cannot be operated properly with one hand. Those that might permit one handed operation are usually operated in an unsafe manner if operated by one hand. In addition, the operator's arm is generally subject to increased fatigue if a hand held power cutting tool is operated with only one hand.

A particular hazardous drawback of hand held cutting tools which utilize a rotating cutting edge (such as chainsaws) is the tendency for the cutting tool to "kickback" when jammed. The rotating part of the cutting tool, such as the chain of a chainsaw, when stopped or impaired, causes an upward force on the tool. This can be extremely dangerous to the user as the rotating chain or other cutting portion can be forced upwards and back to pivot towards the user and can seriously cut the user. The pivot point is generally the wrist of the hand of the user holding the cutting tool which is the weakest point between the user and the tool. The wrist is generally controlled by relatively weak muscle groups which are unable to properly control or prevent "kickback".

A further disadvantage of previous cutting tools is that separate cutting tools are necessary for girdling a tree and for cutting through a tree. Two separate tools are required to be carried by the user if he wishes to girdle some trees and cut through other trees or tree branches.

SUMMARY OF THE INVENTION

In accordance with the present invention, there is provided a portable cutting apparatus comprising a cutting tool, a motor, driving means for operatively connecting the tool to the motor for driving the tool and a control unit attached to the tool having means for mounting the unit on a person's arm. In a preferred form, the control unit is pivotally attached to the tool. The cutting apparatus may also include means on the control unit for controlling motor speed. The cutting apparatus preferably includes a hand grip gripping means on the control unit, the means for controlling being mounted on the hand grip. The tool may be disengageable from the driving means. The tool may be a chainsaw.

This invention provides a portable cutting apparatus with a control unit having means for mounting the unit, and thereby the cutting tool, on the arm of the user. This reduces the problems inherent in the prior art cutting apparatuses previously described. It can be seen that the arm, rather than the hand, supports the cutting apparatus. This reduces fatigue and the dangerous effect of "kickback". Only one arm is required to safely operate the cutting apparatus while at the same time providing considerably improved control over the cutting head. This leaves the user's other hand and arm free to assist in holding branches, for balancing the user and for cutting the tree or branch. Furthermore, a girdling head is described which can both girdle a tree and cut through a tree or tree branch.

DESCRIPTION OF THE PREFERRED EMBODIMENT

Figure 1:
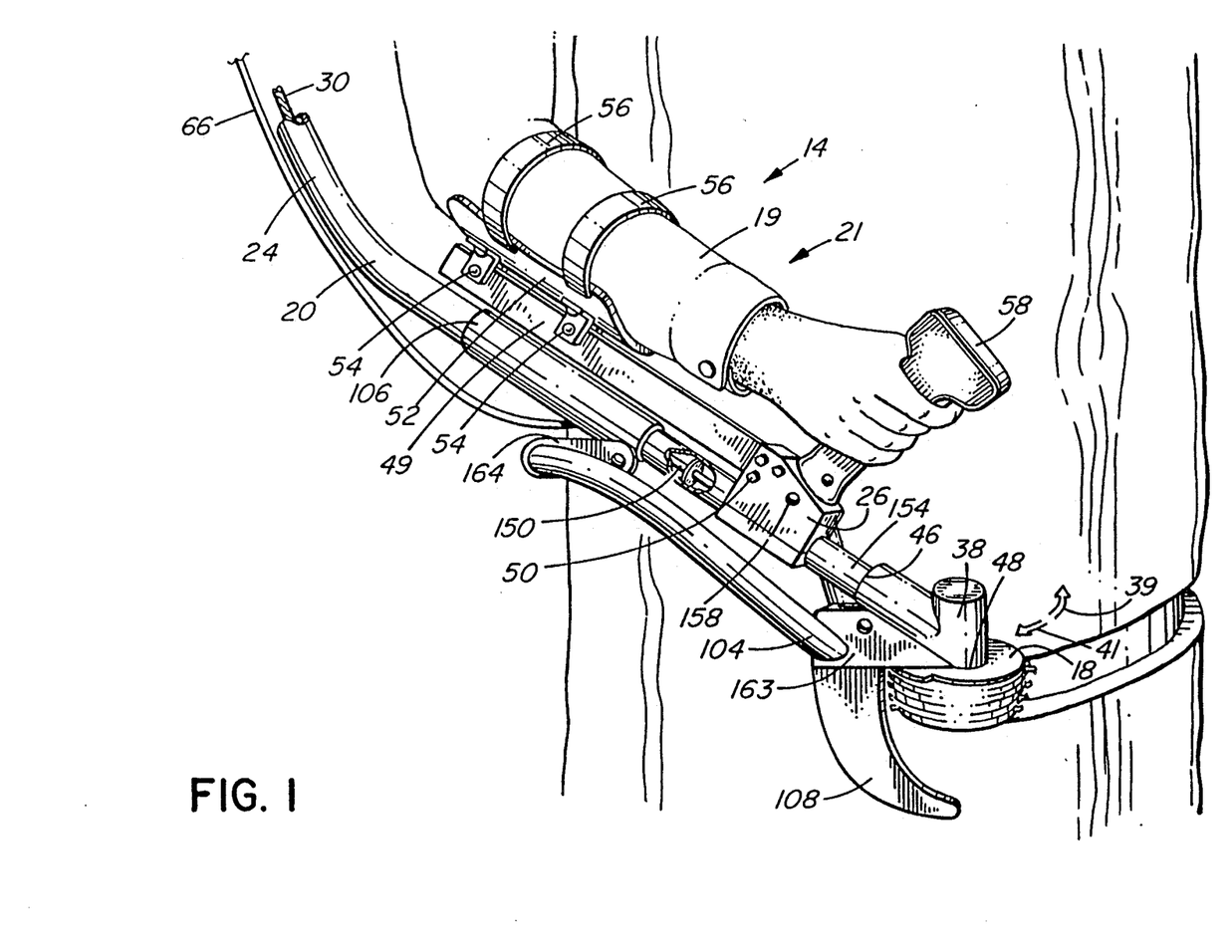
FIG. 1 is a perspective view showing a portable cutting apparatus according to an embodiment of the present invention in operative position and girdling a tree trunk.
Figure 12:
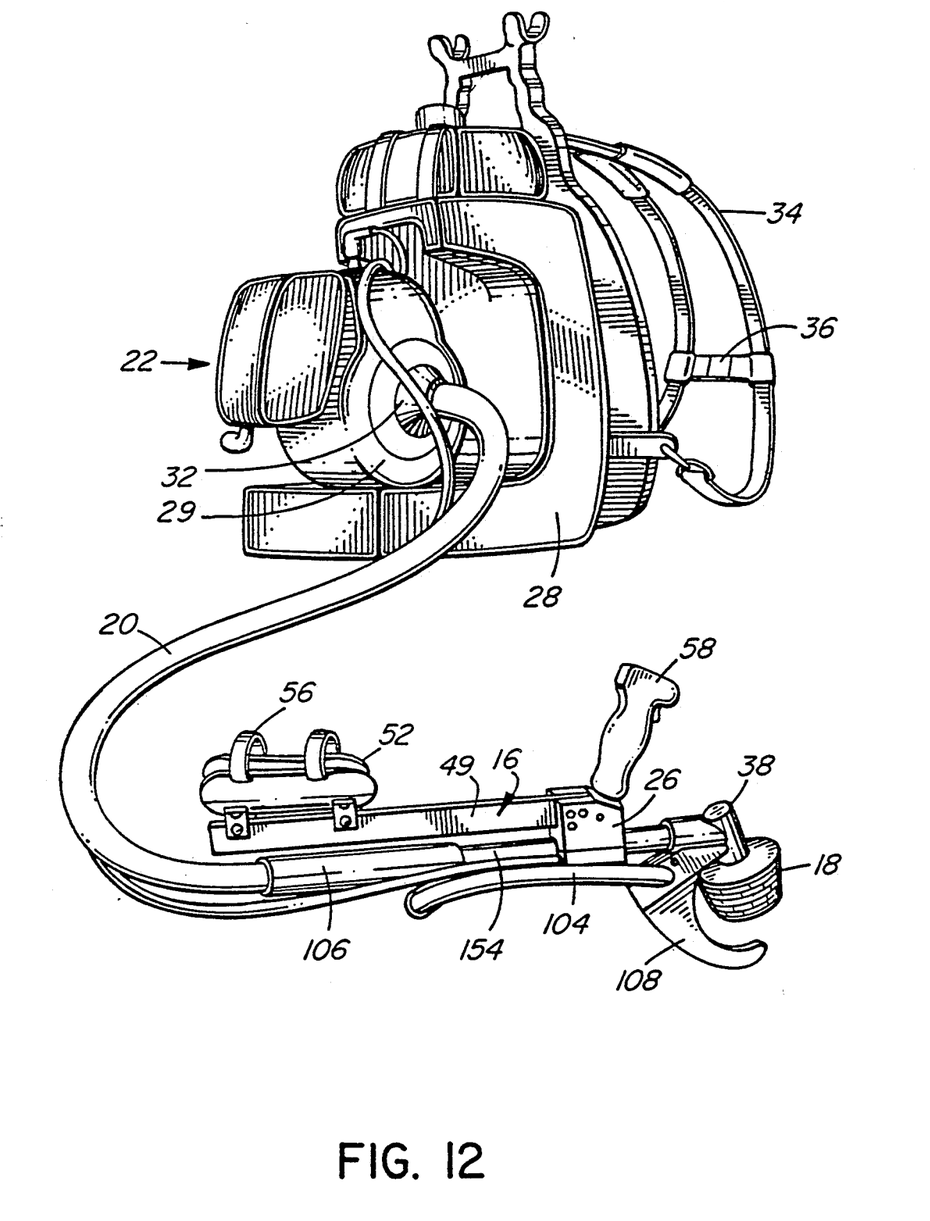
FIG. 12 is a plan view of the cutting apparatus showing the frame and engine mounted thereon.

Referring to FIGS. 1 and 12, portable cutting apparatus 14 is shown, which includes gas powered motor 22 mounted on backpack frame 28 for mounting on the user's back. There is a control unit 16 having mounting means for mounting the unit on an arm 19 of a user. Apparatus 14 has a cutting tool 18 used primarily to girdle a tree trunk and also to cut through branches and small tree trunks. However it is to be understood that various cutting heads and other desireable tools may be used and mounted in place of tool 18. There is driving means for operatively connecting motor 22 to the tool for driving the tool. In this embodiment the driving means is a flexible drive shaft 20.

Figure 2:
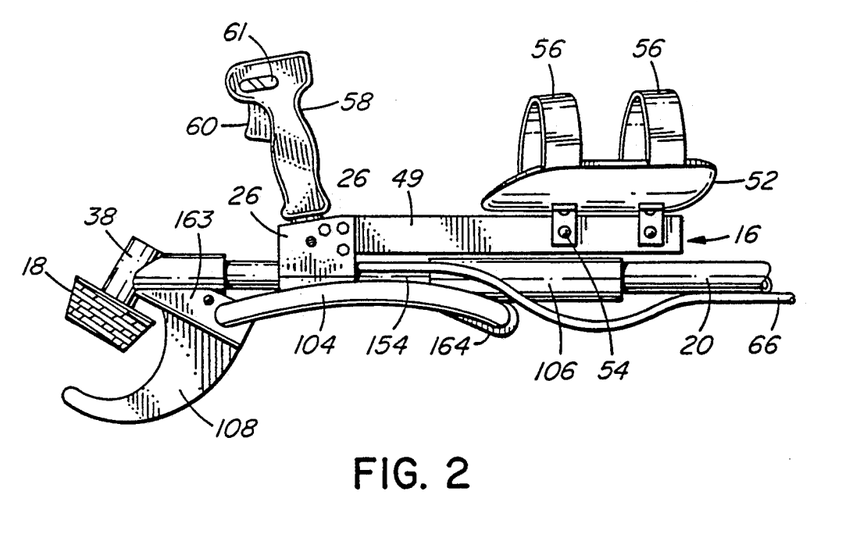
FIG. 2 is a side elevation of the cutting apparatus.
Figure 3:
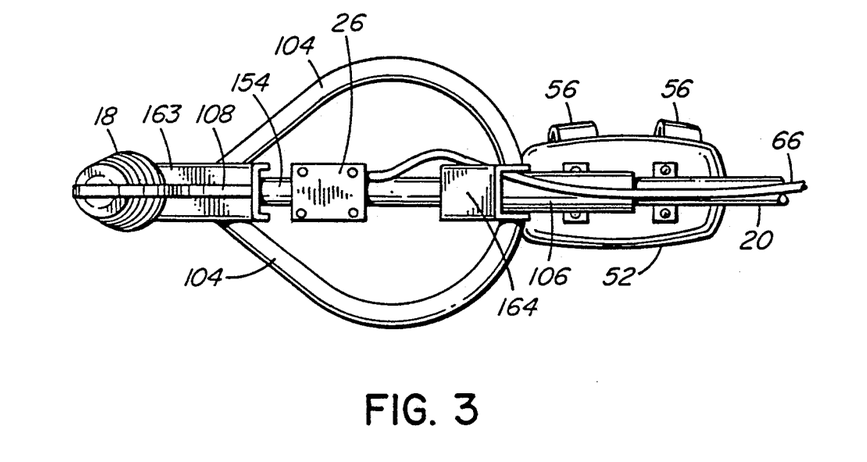
FIG. 3 is a bottom view thereof.

FIGS. 1, 2 and 3 show the portion of apparatus 14 which is supported by the user's arm, said portion being generally designated as 21. Tool 18 of this embodiment is shaped for girdling trees and cutting through branches and smaller tree trunks. Tool 18 is rotatably mounted on tool housing 38 by means of conventional shaft. In turn the shaft is operatively connected to power shaft 30 by bevel gears in housing 38.

In FIG. 1, flexible shaft 20 is shown, being of conventional design and includes a flexible hollow sheathing 24 connected to motor housing 29 at the end adjacent motor 22. Within sheathing 24 is cable 30 which is adapted to rotate within sheathing 24. Cable 30 is attached to a centrifugal clutch drum (not shown) of motor 22 at one end and, by means of solid drive shaft 150, bevel gears 140 and 142 and friction washers 151, to tool 18 at the other end.

Engagement of centrifugal clutch drum of motor 22 causes rotation of flexible drive shaft 30 which, in turn causes the rotation of rigid drive shaft 150 located generally below portion 21 of portable cutting apparatus 14. This rotation causes the rotation of a bevel gear 140, attached to the end of shaft 150, and, in turn, its counterpart bevel gear 142. This is seen in more detail in FIG. 9 which shows bevel gears 140 and 142 within gear casing 38. Rotation of bevel gear 142 causes rotation of solid splined drive shaft 152 which causes the rotation of washers 151. Reverse thread bolt 153 is tightened into shaft 152 to cause clamping pressure on washes 151, thereby rotating tool 18. The friction mounting of tool 18 between washers 151 permits the washers 151 to slip if tool 18 becomes stuck or jambed reducing the risk of damage to tool 18 and other moving parts in the apparatus. Sheathing 24 supports cable 30 and is flexible, permitting transverse flexing along the length of drive shaft 20 without impeding the rotation of cable 30.

In FIG. 12, motor 22 is shown which supplies power to centrifugal clutch drum (not shown), within centrifugal clutch housing 32. Of course, other methods of generating power to drive shaft 30 may be employed; for example electric motors and the like. Motor 22 is mounted on frame 28 which is supported on the back of the user by means of two backpack straps 34. Strap 36 is employed to fasten the lower portion of straps 34 together to provide added support and control of frame 28 when on the user's back.

Motor 22 pivots on frame 28 to permit flexible drive shaft 20 to freely rotate approximately 270 degrees. This permits operation with either arm of the user. Sheathing 24 pivots within outer casing 106 approximately 300 degrees upon the twisting of the wrist of hand 23. Sheathing covers cable 30 and is attached to outer casing 106 at the front end, and to motor housing 29 at the rear end. As seen in FIG. 1, inlet end 46 of casing 38 is angled in relation to output end 48 of casing 38. The preferred angle is approximately thirty (30) degrees.

Figure 11:
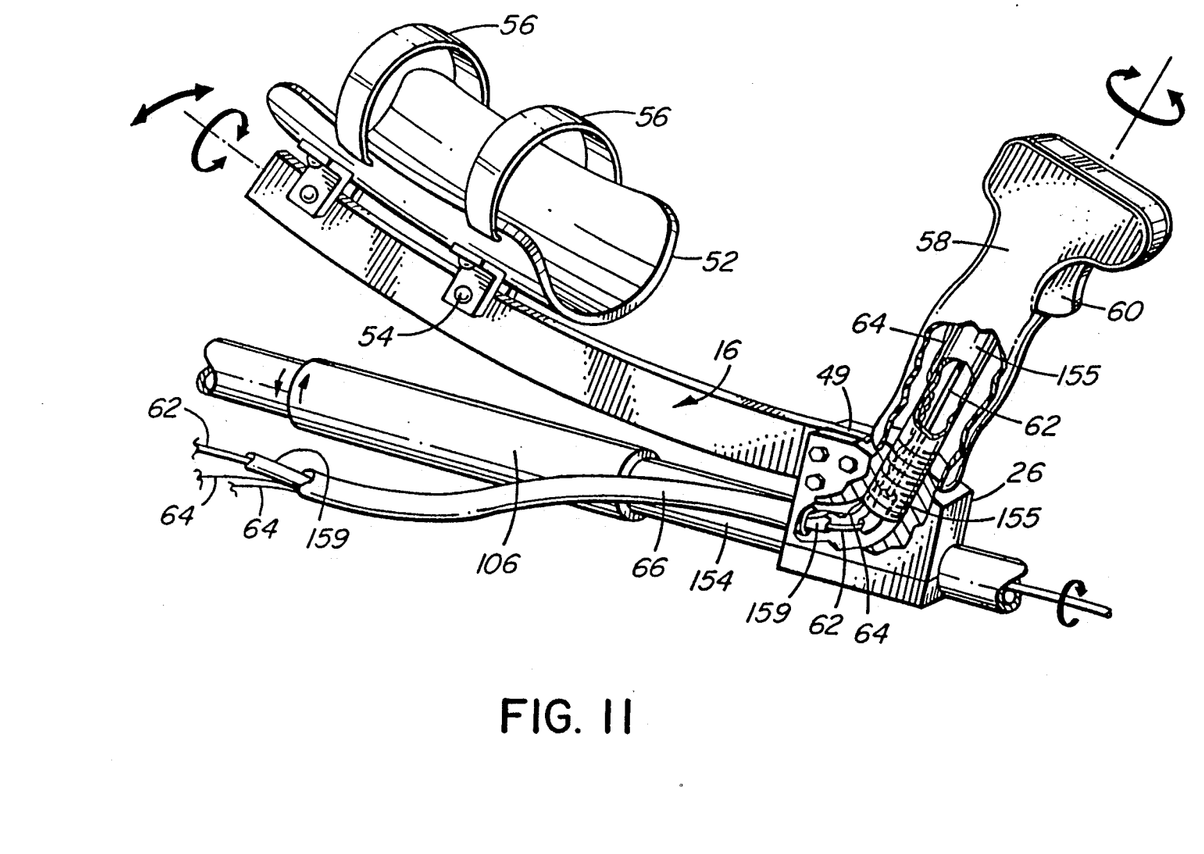
FIG. 11 is a perspective view of a portable cutting apparatus of the present invention showing the flexing of the control unit and gripping means.

Unit 16 is connected to outer casing 154 by means of mount 26. Flat spring steel 49 is connected to mount 26 by suitable means. Bolts 50 are used in this embodiment. Arm support 52 is attached to the top edge of spring steel 49 by a suitable fastening means which includes bolts 54 in this case. Support 52 is shaped concavely on top to fit the bottom of the user's forearm. Straps 56 are securable around the user's arm and have bottom ends connected to support 52. Spring 49 extends width-wise between the user's arm and mount 26 and so can flex in use to permit sideways movement of tool 18 in the directions indicated by arrows 39 and 41 of FIG. 1. This flexing is also shown in FIG. 11 with respect to the second embodiment. A control handle 58 is pivotally connected to housing 26 in a manner to permit pivoting about an axis generally twelve (12) degrees forward of the perpendicular with respect to outer casing 154. This permits the user's hand to support control unit and remain stationary when the unit moves side to side through flexing of spring 49.

Figure 13:
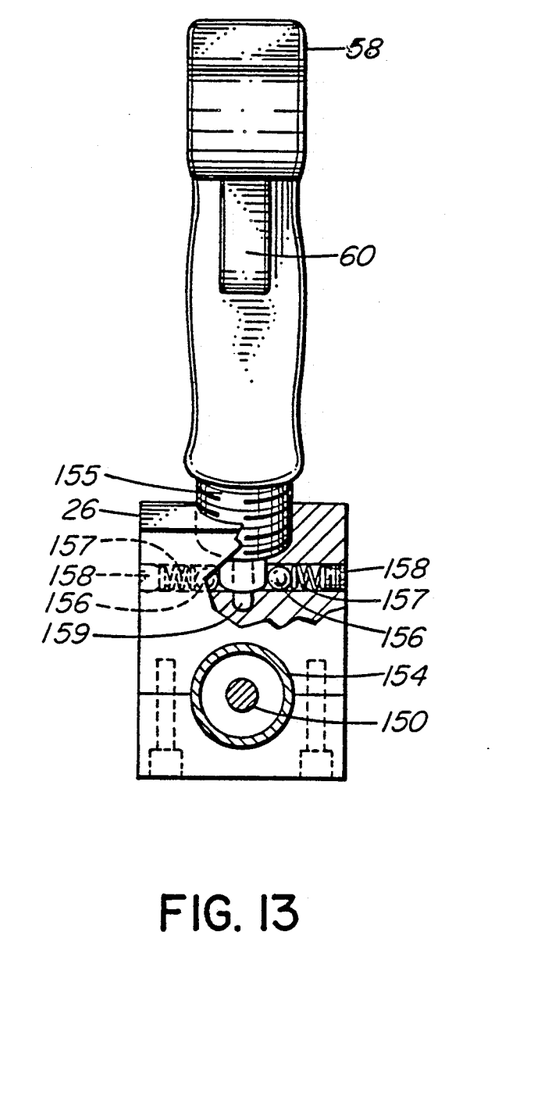
FIG. 13 is a front view, partially broken away, of the mount showing the handle attached thereto.

As seen in FIG. 13, optionally, mount 26 includes an adjustable stop 158 which permits handle 58 to be rotated a maximum of forty-five degrees (45°) in either direction, thereby preventing tool 18 from moving past a vertical position. This prevents tool 18 swinging about towards the user or other nearby individuals. Handle 58 is attached to mount 26 by rolled steel piece 155. Piece 155 is threaded and screwed into mount 26, thereby permitting handle 58 to pivot. The bottom of piece 155 is flattened on either side. Ballbearings 156, coil spring 157 and pipe plug 158 exert adjustable pressure upon each flattened side of piece 155. This dampens the rotation of handle 58 and automatically returns handle 58 to an upright position in line with mount 26.

Figure 10:
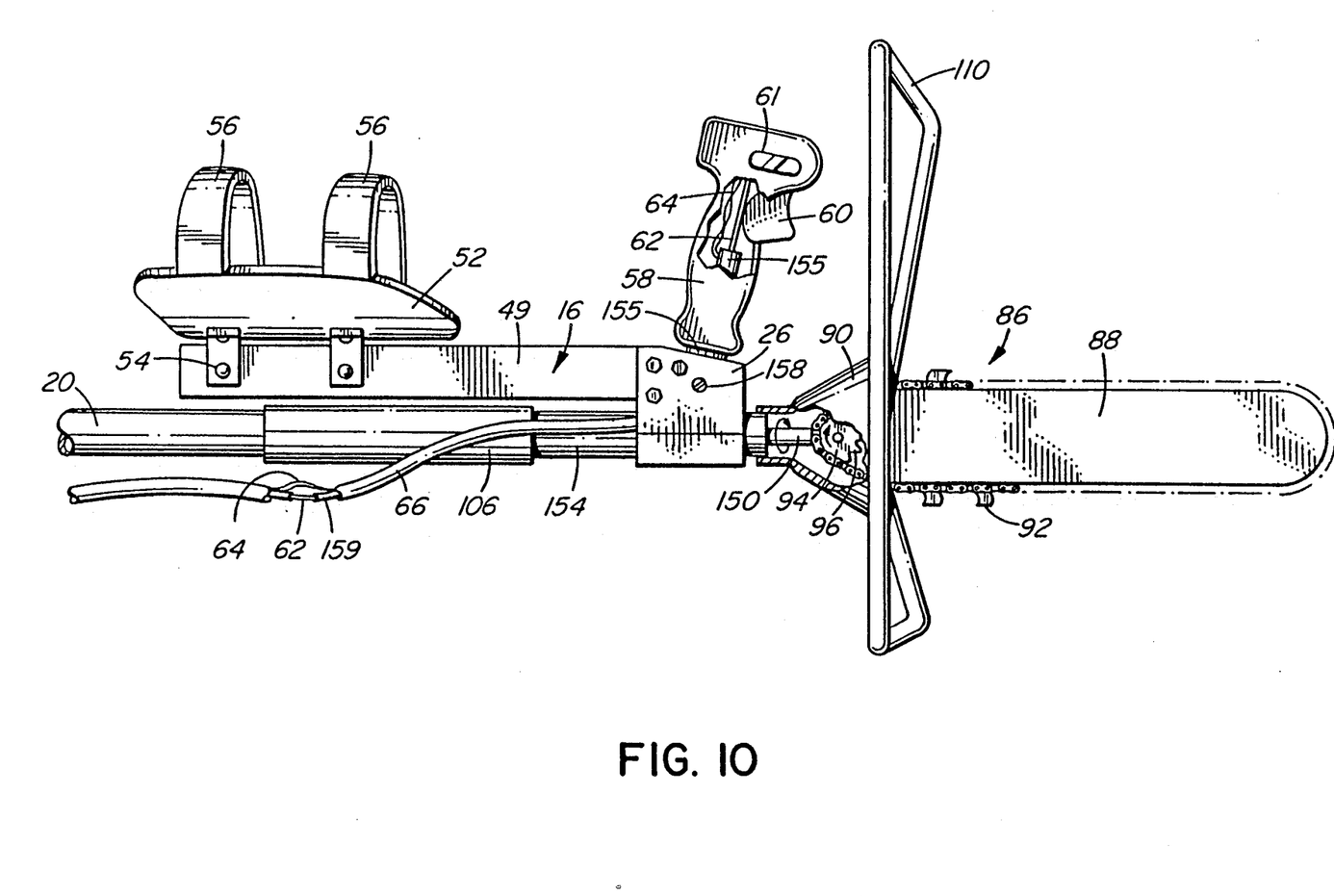
FIG. 10 is a side elevation of a cutting apparatus according to an alternative embodiment of the invention having a chain saw cutting head.

As seen in FIGS. 10 and 11, there is throttle switch 60 positioned on handle 58 in a position for operation by the first finger of the user's hand. The user can thereby control engine 22 throttle without removing his hand from handle 58. Similarly, ignition switch 61 is attached to handle 58 opposite the thumb of the operator. Throttle cable 62 and ignition wires 64 connect switch 60 and switch 61, respectively, with motor 22. Cable 62 and wires 64 pass down the centre of handle 58, through mount 26. Cable 62 and wires 64 exit the rear of mount 26 and are housed in hollow tube 66. Tube 66 generally follows sheathing 24 to motor 22. Ignition wires 64 are attached to the ignition (not shown) of motor 22 and throttle cable 62 is attached to the carburator (not shown) of motor 22. Switch 61 preferrably has three ignition positions; namely, "off", "on" and "start". Switch 60 preferrably has a range of throttle positions to vary the speed of motor 22.

Figure 7:
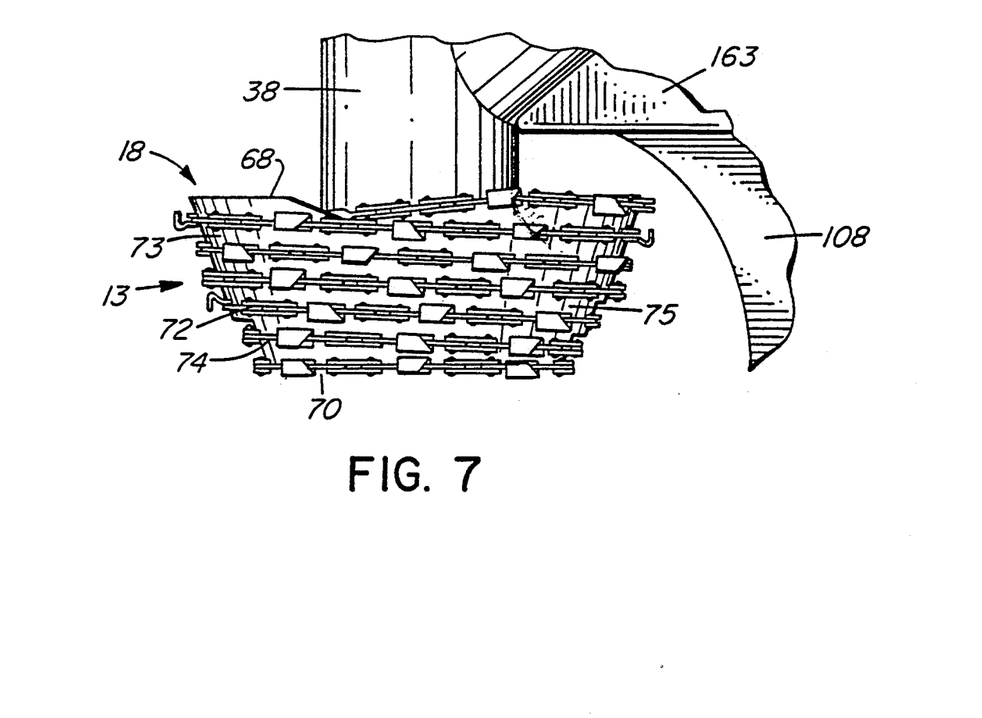
FIG. 7 is a side view of a cutting head of the cutting apparatus of FIGS. 1–6.
Figure 8:
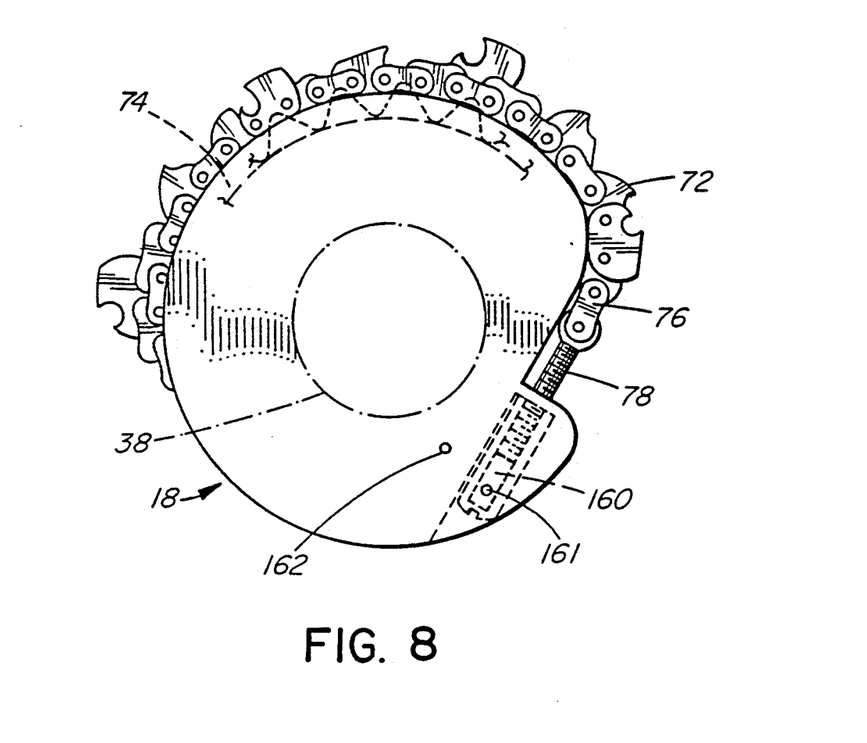
FIG. 8 is a top plan thereof.
Figure 9:
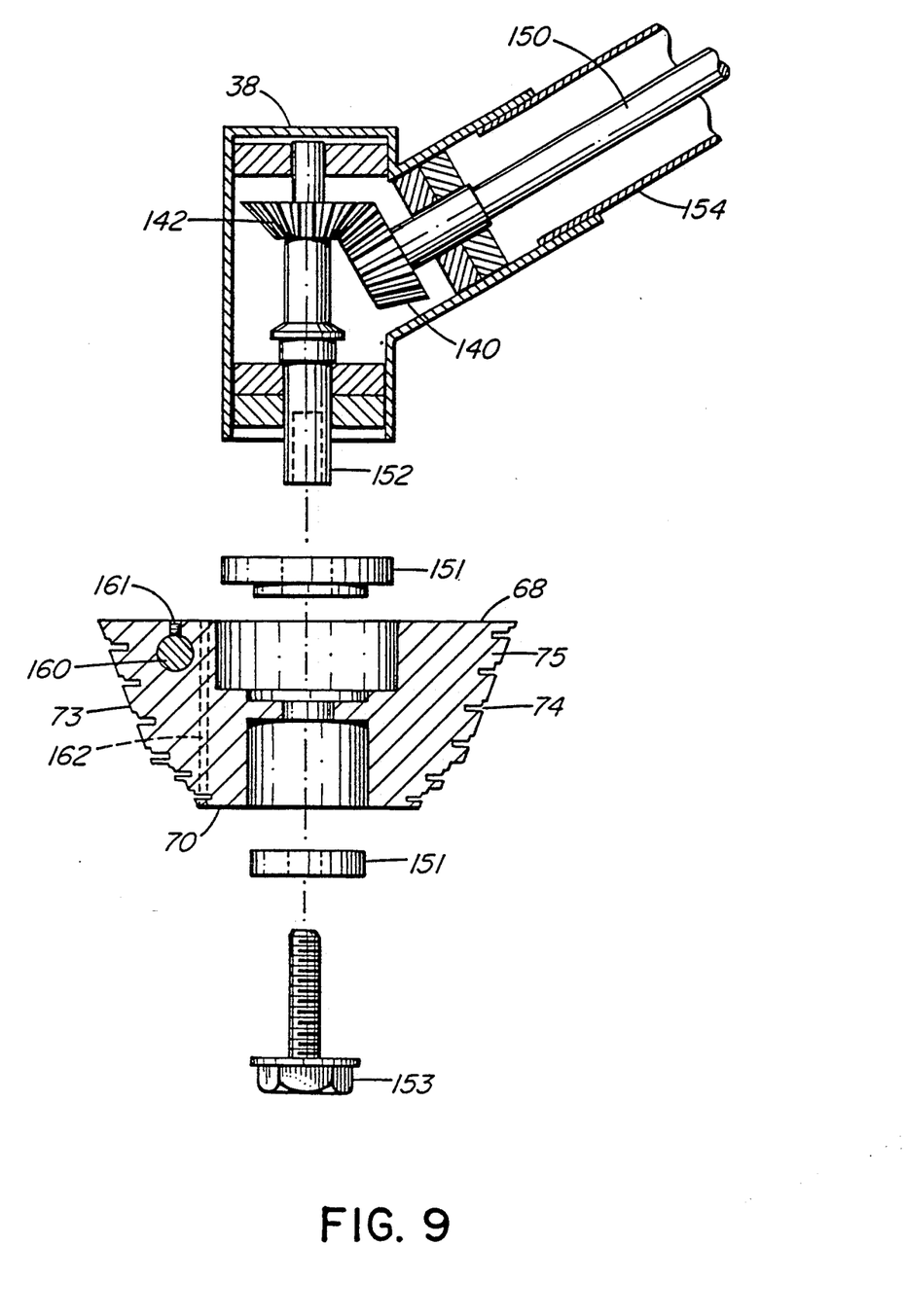
FIG. 9 is a sectional exploded side view thereof.

Tool 18 is best seen in FIGS. 7, 8 and 9 and has a body 75 which is generally frusto-conical in shape with larger diameter end 68 on top and smaller diameter end 70 on the bottom. The angle of face 73 with respect to end 68 is approximately twenty (20) degrees. A length of chain saw chain 72 is wrapped in a spiral groove 74 extending around the outside face 73 of body 75. The end (not shown) of chain 72, which is the leading or first cutting end, is adjacent end 70 of the tool. Steel pin 162 secures the leading or first cutting end of chain 72 to body 75. Trailing end 76 of chain 72 is connected to body 75 adjacent end 68 of the tool, by means of adjustment screw 78 and adjustment cylinder 160 which permits the tightening or loosening of chain 72 in groove 74. Set screw 161 locks adjustment cylinder 160 so that no unwanted loosening occurs. The width between the outside edge of the top and bottom section of chain 72 defines the maximum width of the cut which may be made by that particular tool without moving tool 18 upwards or downwards. The maximum depth of the cut into the wood is determined by the distance between output end 48 of gear casing 38 and furthest outwardly extending chainsaw tooth located adjacent larger diameter end 68 of tool 18.

The conical shape of tool 18 allows the full face 13 of tool 18 to be presented squarely to the tree to be girdled when the user has his or her arm in a comfortable operating position. The conical shape of tool 18 also permits debris, such as bark and sawdust, to readily fall from upper chain 72 sections without unduly inhibiting the action of chain 72 below these sections.

As is shown in FIGS. 1, 2 and 3 with respect to the first embodiment, "C"-shaped side guard 104 extends from bracket 163 towards motor 22 to outer casing bracket 164. A second guard 104 extends in a similar manner from the opposite side of bracket 163 and outer casing bracket 164. Guard 104 acts to prevent contact between the operator or other persons and tool 18, reducing the chance of someone being cut by tool 18. As well bottom guard 108 extends downward from bracket 163 and curves in a forward direction to prevent accidental contact with tool 18 from below apparatus 14.

As seen in FIG. 1, portion 21 is supported by one arm of the user. Control unit 16 is strapped to the user's arm by means of straps 56. Support 52 is held securely below the arm when straps 56 are tightened. Tool 18 can be moved in directions 39 and 41 when the user pivots his or her elbow in a lateral direction. Tool 18 may be twisted about shaft 20 with lateral movement of handle 58 by hand 23 of the user.

In the first embodiment tool 18 is used to girdle a tree and to cut through small trees and branches. Tool 18 having a diameter of about 4.175 inches (including chain 72) will cut through branches or tree trunks which are less than two (2) inches in diameter. In girdling trees, the tree trunk is circled with an annullar groove cut around the circumference of the tree. The orientation of housing 38 aligns tool 18 in a horizontal direction when arm 19 of the user is held slightly below the horizontal. This is the preferred arm direction of the user which reduces fatigue on arm 19 and permits control of portion 21 with proper orientation of tool 18 with respect to the tree or tree branch. Hand 23 is free to move handle 58 in a lateral direction pivoting tool about shaft 20; shaft 20 being twistable along a portion of its length. Cable 30 continues to turn within sheathing 24 and transfer power from motor 22 to tool 18, no matter what the position of arm 19 and hand 23.

The positioning of throttle switch 60 and ignition switch 61 on handle 58 enable the user to operate those switches with hand 23 while hand 23 continues to grip handle 58. The user thereby remains in control of portion 21 at all times with the use only of arm 19 and hand 23. The other hand of the user is free to assist the user in cutting or girdling a tree or branch, in supporting the user or in manipulating shaft 20.

Figure 4:
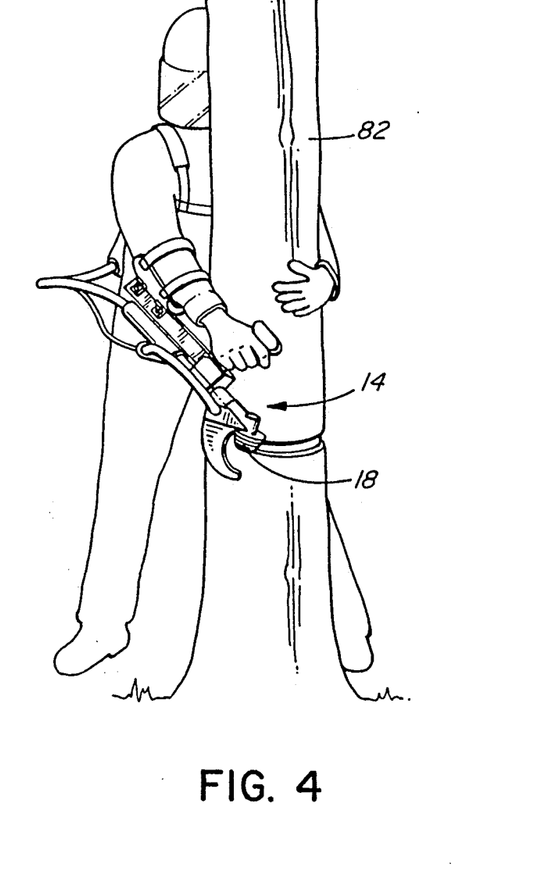
FIG. 4 is a perspective view of the cutting apparatus and an operator showing the operator girdling the tree trunk to his right.
Figure 5:
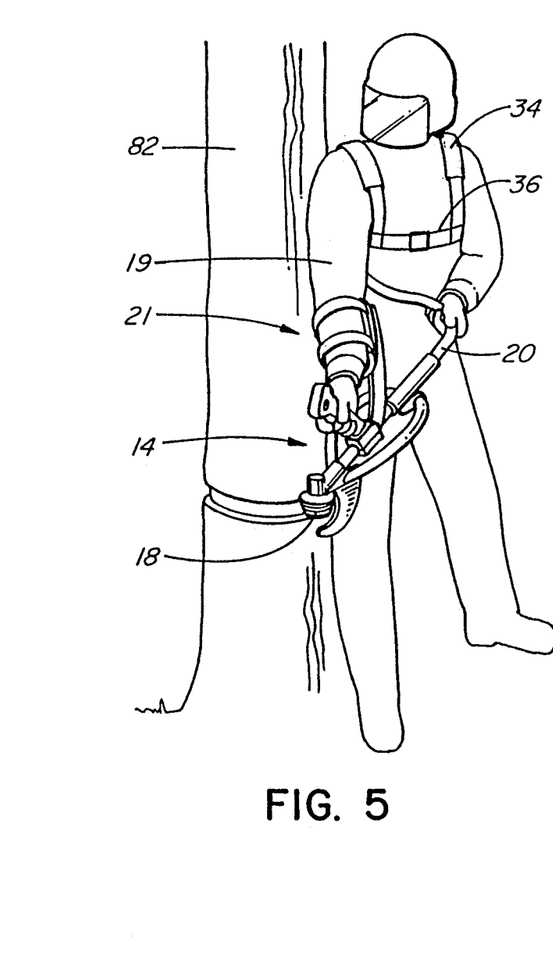
FIG. 5 is a perspective view of the operator girdling a tree trunk to his left.

FIGS. 4 and 5 show the user girdling a tree using portable cutting apparatus 14 with tool 18 attached thereto. FIG. 4 shows the user girdling the rear and right-hand side of tree trunk 82 by holding left side of apparatus 14 adjacent trunk 82 so that chain 72 of tool 18 cuts a horizontal groove into trunk 82 along its rear and right-hand side. As seen in FIG. 5, the operator then moves to the other side of trunk 82 to complete the girdling operation. Operator holds the right side of apparatus 14 adjacent trunk 82, with girdler 18 in a horizontal position, and cuts into trunk 82 with girdler 18. In this manner, a continuous annular groove is cut about the complete circumference of trunk 82. As seen in FIGS. 4 and 5, the left hand of the operator is not needed to support or control apparatus 14. This hand is free to hold the tree trunk, to support the operator (as seen in FIG. 4) or to properly align drive shaft 20 (as seen in FIG. 5).

Figure 6:
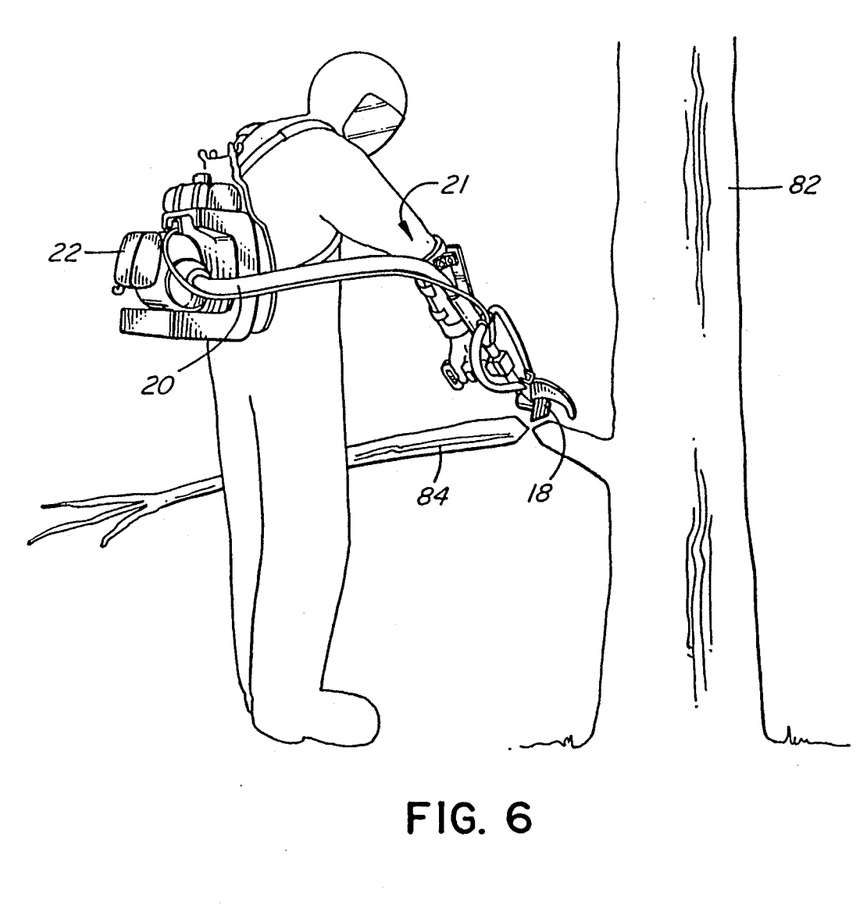
FIG. 6 is a perspective view of the operator using the said embodiment of the cutting apparatus to cut the branch of a tree.

FIG. 6 shows the user cutting through a small tree trunk or a tree branch using portable cutting apparatus 14 with tool 18 attached thereto. The trailing edge of chain 72, i.e. the top row of chain 72, is oriented so that chain 72 cuts into branch 84. The apparatus is held so tool 18 is perpendicular to branch 84 so that an angled cut is made in branch 84. This is repeated by holding tool 18 against the branch in the opposite direction. A "V" shaped cut is made in the branch. If necessary, the opposite side of the branch is cut in a similar manner. Larger branches can be cut through using this method. However, additional cuts may have to be employed to cut completely through a larger branch. At some point a given diameter of tool 18 will be unable to cut through a branch which is beyond a certain diameter. The one-handed operation of portable cutting apparatus 14 permits the user to hold the branch while cutting it thereby enabling a cleaner cut of the branch by preventing the branch from falling prematurely.

FIG. 10 illustrates a second embodiment of this invention adapted for use as a chainsaw 86 instead of a girdler. Chainsaw 86 has a cutter bar 88 attached to unit 16 at the front end of the unit. Housing 90 is attached to the front of unit 16 and acts to protect the user from flying debris and from being cut by chainsaw 86. Chainsaw chain 92 extends about cutter bar 88 in the conventional manner. Sprocket 94 is connected to the end of shaft 150 for rotation in the plane of blade 88. Sprocket 94 has teeth 96 on its outer circumference which engage chain 92. Handle 58, as previously described with respect to the first embodiment, is attached to mount 26. This embodiment includes guard 110 attached to housing 90 which extends in a rectangle, laterally from housing 90 to prevent accidental contact with chainsaw 86.

The second embodiment permits the user to operate unit 16 in much the same manner as a conventional chainsaw with the use only of one arm which supports and controls unit 16. The other arm of the user is free to assist the user in holding branches, balancing himself and to do other such tasks.

Various changes and modifications in the portable cutting apparatus as herein described may occur to those skilled in the art, and to the extent that such changes or modifications are embraced by the appended claims, it is to be understood that they constitute part of the present invention.

I claim:
1. A portable cutting apparatus, comprising:
   a cutting tool;
   a motor;
   driving means for operatively connecting the motor to the tool for driving the tool;

a control unit connected to said tool for gripping with a user's hand, the control unit supporting the driving means;

mounting means for mounting the control unit to a user's forearm;

hinge means for connecting said mounting means to the control unit, said hinge means being laterally spaced apart from the driving means and being sufficiently stiff within a first plane to support weight of the control unit and cutting tool when extending from the mounting means, and being relatively flexible within a second plane disposed generally normally to the first plane to permit relative lateral movement between the mounting means and an adjacent portion of the driving means when an elbow of said forearm is moved outwardly or inwardly in relation to a user's body to permit said mounting means to move relative to of said driving means as the elbow is moved.

2. An apparatus as described in claim 1, wherein said hinge means comprises a substantially flat elongated member twistable along its length.

3. An apparatus as described in claim 1, wherein the hinge is adjacent the control unit.

4. An apparatus as described in claim 1, wherein said driving means comprises a rotatable, flexible cable operatively connecting the tool to the motor.

5. An apparatus as described in claim 4, wherein the control unit has a front, a rear and a top, the mounting means being connected on the top thereof, the tool being on the front thereof and the driving means extending from the rear to the front below the means for mounting.

6. An apparatus as described in claim 1 further comprising switch means on the control unit for switching the apparatus on and off.

7. An apparatus as described in claim 1, further comprising means on the control unit for controlling motor speed.

8. An apparatus as described in claim 7, wherein the means for controlling is on the control unit in a position accessible to the hand of a person's arm on which the control unit is mounted.

9. An apparatus as described in claim 8, wherein said means for controlling is accessible to the first finger of said hand.

10. An apparatus as described in claim 8, further comprising a hand grip mounted on the control unit, the means for controlling being mounted on the hand grip.

11. An apparatus as described in claim 10, wherein said handgrip extends from the control unit substantially perpendicular to the driving means.

12. An apparatus as described in claim 10, wherein said hand grip is pivotally connected to the control unit.

13. An apparatus as described in claim 1, further comprising a tool mount, the tool being mounted on the tool mount.

14. An apparatus as described in claim 1 wherein the tool is disengageable from said driving means.

15. An apparatus as described in claim 1, wherein the cutting tool includes cutting teeth.

16. An apparatus as described in claim 1, wherein the cutting tool includes a body and a length of chainsaw chain extending about said body.

17. An apparatus as described in claim 16, wherein the length of chainsaw extends in a spiral about said body.

18. An apparatus as described in claim 16, further comprising adjusting means, connected to one end of said length for adjusting the tension of said length about said body.

19. An apparatus as described in claim 18, wherein said adjusting means comprises an adjustment screw and adjustment cylinder with the screw adapted to rotate within the adjustment cylinder to tighten or loosen the length of chainsaw chain about said body.

20. An apparatus as described in claim 16 wherein said body is frustoconical in shape.

21. An apparatus as described in claim 1 further comprising means for mounting the motor on a person's back.

22. An apparatus as described in claim 1 further comprising a guard means adjacent the tool and spaced apart therefrom for guarding the user from being cut by the tool.

23. An apparatus as described in claim 22 wherein the guard means has a concave edge facing the tool.

24. An apparatus as described in claim 22 wherein the guard is crescent-shaped in the direction of the tool.

25. An apparatus as described in claim 1, wherein the hinge means is flexible to permit lateral movement of the mounting means relative to the unit along an axis substantially perpendicular to the axis of the driving means and is rigid to inhibit movement perpendicular to the said lateral movement.

26. An apparatus as described in claim 1, wherein the hinge means is a length of flat spring steel oriented width-wise between the mounting means and the control unit.

27. A portable cutting apparatus comprising:
 (a) a control unit grippable by an operator's hand,
 (b) a cutting tool and driving means mounted on the control unit, the driving means cooperating with the cutting means to supply power thereto, the driving means extending from the control unit and being connectable to a motor to receive power therefrom,
 (c) mounting means for mounting the control unit to a user's arm to support the apparatus,
 (d) hinge means for connecting the mounting means to the control unit, the hinge means extending from the control unit in a direction generally similar to the driving means, but being spaced therefrom essentially to prevent interference therewith, the hinge means being sufficiently stiff with respect to a first plane passing through the control unit to support weight of the control unit when extending from the mounting means, and being relatively flexible with respect to a second plane disposed generally normally to the first plane and passing through the control unit.

28. An apparatus as described in claim 27, wherein said driving means comprises a rotatable, flexible cable.

29. An apparatus as described in claim 27, further comprising switch means on the control unit for switching the apparatus on and off.

30. An apparatus as described in claim 27, wherein said switch means is accessible to the first finger of the hand of a person's arm on which the control unit is mounted.

31. An apparatus as described in claim 27, wherein the tool is disengageable from said driving means.

32. An apparatus as described in claim 27, wherein the cutting tool includes a body and a length of chainsaw chain extending about said body.

33. An apparatus as described in claim 32, wherein the length of chainsaw extends in a spiral about said body.

34. An apparatus as described in claim 33, further comprising adjusting means, connected to one end of said length for adjusting the tension of said length about said body.

35. An apparatus as described in claim 34, wherein said adjusting means comprises an adjustment screw and adjustment cylinder with the screw adapted to rotate within the adjustment cylinder to tighten or loosen the length of chainsaw chain about said body.

36. An apparatus as described in claim 33, wherein said body is frusto-conical in shape.

37. An apparatus as described in claim 27, further comprising a guard means adjacent the tool and spaced apart therefrom for guarding the user from being cut by the tool.

38. An apparatus as described in claim 37, wherein the guard means has a concave edge facing the tool.

39. An apparatus as described in claim 37, wherein the guard means is crescent-shaped in the direction of the tool.

40. An apparatus as described in claim 27, wherein said hinge means comprises a substantially flat, elongated member twistable along its length.

41. An apparatus as described in claim 27, wherein said mounting means circumferentially encloses a user's forearm.

* * * * *